(12) United States Patent
Klausmeier

(10) Patent No.: US 8,630,885 B2
(45) Date of Patent: Jan. 14, 2014

(54) SYSTEM AND METHOD FOR PROVIDING TEMPORARY AND LIMITED GRANTS OF CALENDAR ACCESS

(75) Inventor: Daniel Klausmeier, Los Gatos, CA (US)

(73) Assignee: Skadool, Inc., Los Gatos, CA (US)

( * ) Notice: Subject to any disclaimer, the term of this patent is extended or adjusted under 35 U.S.C. 154(b) by 230 days.

(21) Appl. No.: 11/501,637

(22) Filed: Aug. 8, 2006

(65) Prior Publication Data

US 2008/0040188 A1    Feb. 14, 2008

(51) Int. Cl.
*G06Q 10/00*    (2012.01)

(52) U.S. Cl.
USPC ....... 705/7.24; 705/7.16; 705/7.17; 705/7.18; 705/7.19; 707/951

(58) Field of Classification Search
USPC ................................ 705/7.11–7.42; 707/951
See application file for complete search history.

(56) References Cited

U.S. PATENT DOCUMENTS

| | | | |
|---|---|---|---|
| 4,881,179 A * | 11/1989 | Vincent | 358/1.14 |
| 5,124,912 A | 6/1992 | Hotaling et al. | |
| 5,790,974 A | 8/1998 | Tognazzini | |
| 5,855,006 A | 12/1998 | Huemoeller et al. | |
| 5,899,979 A | 5/1999 | Miller et al. | |
| 5,963,913 A * | 10/1999 | Henneuse et al. | 705/7.13 |
| 6,018,343 A | 1/2000 | Wang et al. | |
| 6,064,977 A | 5/2000 | Haverstock et al. | |
| 6,272,074 B1 | 8/2001 | Winner | |
| 6,278,456 B1 | 8/2001 | Wang et al. | |
| 6,369,840 B1 * | 4/2002 | Barnett et al. | 715/853 |
| 6,370,554 B1 * | 4/2002 | Sun-Woo | 708/112 |
| 6,732,080 B1 | 5/2004 | Blants | |
| 6,823,357 B1 | 11/2004 | Du et al. | |
| 7,120,672 B1 * | 10/2006 | Szeto et al. | 709/206 |
| 7,343,312 B2 * | 3/2008 | Capek et al. | 705/7.19 |
| 7,383,308 B1 * | 6/2008 | Groves et al. | 709/206 |
| 7,660,904 B2 * | 2/2010 | Qureshi et al. | 709/229 |
| 2003/0018725 A1 * | 1/2003 | Turner et al. | 709/206 |
| 2003/0061087 A1 * | 3/2003 | Srimuang | 705/8 |
| 2004/0093290 A1 * | 5/2004 | Doss et al. | 705/35 |
| 2004/0107256 A1 * | 6/2004 | Odenwald et al. | 709/205 |
| 2005/0267975 A1 * | 12/2005 | Qureshi et al. | 709/229 |
| 2006/0190313 A1 * | 8/2006 | Lu | 705/8 |
| 2007/0162589 A1 * | 7/2007 | Riddle | 709/223 |
| 2008/0134344 A1 * | 6/2008 | McBrearty | 726/28 |
| 2009/0019050 A1 * | 1/2009 | Baron et al. | 707/9 |
| 2010/0153162 A1 * | 6/2010 | Tam et al. | 705/8 |

OTHER PUBLICATIONS

Palen, Leysia. "Social, individual and technological issues for groupware calendar systems." Proceedings of the SIGCHI conference on Human factors in computing systems. ACM, 1999.*

(Continued)

*Primary Examiner* — Alan S Miller
(74) *Attorney, Agent, or Firm* — Lewis Roca Rothgerber LLP

(57) ABSTRACT

A system and method for providing temporary and limited grants of calendar access is provided. An invitee or its proxy may provide an event planner or time broker with a particular grant of calendar access comprising a date range, particular days of the week, and a particular time interval. The grant of calendar access allows the event planner to more easily identify a block of time for scheduling the particular event, the invitee calendar being updated in real-time. In some embodiments, the event planner may schedule the event and place the event directly on the invitee's calendar.

45 Claims, 4 Drawing Sheets

(56) References Cited

OTHER PUBLICATIONS

Plaisant, Catherine, et al. "Shared family calendars: Promoting symmetry and accessibility." ACM Transactions on Computer-Human Interaction (TOCHI) 13.3 (2006): 313-346.*

Tullio, Joe, et al. "Augmenting shared personal calendars." UIST. vol. 2. 2002.*

Author Unknown, "Introduction to Microsoft Outlook 2003 Calendar," Sep. 6, 2004.

* cited by examiner

John's Midweek BBQ — Unscheduled Invitation

Event Details | Event Discussions | Share Availability

List of Shared Times:

| | | |
|---|---|---|
| [REQUESTED] | 12.00pm – 10.00pm, Thu, May 11 – Fri, May 19, (SMTWTFS) | GRANT / DECLINE |
| [GRANTED] | 6.00pm – 10.00pm, Thu, May 11 - Wed, May 24, (SMTWTFS) | EDIT / REMOVE |
| [EDITING] | 5.00pm – 10.00pm, Thu, May 11 - Wed, May 31, (SMTWTFS) | SAVE / CANCEL |

*Select portions of your calendar where you will share your availability with the event organizer for this event. They will only see when you are free, busy, and tentative during the shared times.*

1. Select a set of dates and days of the week.

First Day in Set: Thu, May 11, 2006 ▼
(can also left click on date of right calendar)

Last Day in Set: Wed, May 31, 2006 ▼
(can also shift-left click on date of right calendar)

Days of the Week:

☐ Sun ☑ Mon ☑ Tue ☑ Wed ☑ Thu ☐ Fri ☐ Sat (can also select check boxes above columns or right calendar)

◄ May, 2006 ►

| ☐ | ☑ | ☑ | ☑ | ☑ | ☐ | ☐ |
|---|---|---|---|---|---|---|
| S | M | T | W | T | F | S |
| 30 | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | 1 | 2 | 3 |

Dates in bold indicate the days where organizer will see you as available.

2. Select a time interval.

12:00 am | 6:00 am | 12:00 pm | 6:00 pm

5:00 PM [ ]        [ ] 10:00 PM

3. Select additional sharing permissions.

*The organizer will see your availability for this shared window. Select options below to give the organizer and invitees additional access to your calendar information during the shared times.*

☑ Allow the organizer to see the titles of your events in this time window (private events excluded).
☐ Allow invitees to see your availability for this time window.
☐ Allow invitees to see the titles of your events in this time window (private events excluded).

[ADD A NEW TIME WINDOW]

Message to Organizer:

Hey John, Thanks for the invite. I'd love to come. You can access my availability through the attached link.

- Bob

SAVE/SEND

SYSTEM AND METHOD FOR PROVIDING TEMPORARY AND LIMITED GRANTS OF CALENDAR ACCESS

BACKGROUND OF THE INVENTION

1. Field of the Invention

The present invention relates, generally, to the interaction of calendaring and scheduling applications over networks and more particularly to providing temporary and limited grants of personal and/or business calendar access to an event organizer to facilitate, for example, planning and organization of an event.

2. Description of the Background Art

Event planning is plagued by what is sometimes referred to as the "let's get together problem." Planning and scheduling an event as simple as a friendly neighborhood barbecue can quickly become a scheduling dilemma in that certain neighbors that are to be invited to the barbecue may only be available on certain days whereas other neighbors may only be available on another day. The availability of the event planner (who may be a professional event planner or simply an individual charged with planning an event), too, is a factor to be considered with respect to when (and in some instances where) an event may be held. The additional factor of at what time particular people are available should a mutually agreeable date be determined adds yet another dimension to planning and scheduling difficulties.

Negotiating and converging on a date, time, and place for an event amongst amenable parties such as friends and family may consume a substantial amount of time for the event planner and invitees (e.g., persons invited to attend a particular event) before any other logistical aspect of the event is even addressed (e.g., shopping for food, barbecue utensils, and the like). Planning an event between two hostile parties (e.g., representatives involved in a contentious negotiation) may be further complicated by personal issues such as individual grandstanding or negotiating 'tactics' to achieve a perceived 'upper hand.' In either instance, it is not unusual for as much time to be spent planning and scheduling the event as it is actually attending the event.

In many instances, this wasted time is simply related to personal availability or the lack thereof. For example, the event planner (Planner X) may want to meet on Wednesday evening but two friends (Invitee Y and Invitee Z) may only be available on Tuesday and Thursday, respectively. In other instances, however, these expended planning 'cycles' are the result of differing and otherwise incompatible calendar systems. For example, one user (e.g., Planner X) may utilize one particular calendar application (e.g., Microsoft Outlook) whereas another user (e.g., Invitee Y) may utilize another calendar application (e.g., Lotus Notes Calendar and Scheduling). As a result, it may not be possible to gain access to the availability of invitees to an event.

Notwithstanding the incompatible calendar application problem, many users of a compatible calendar application (e.g., co-workers operating from the same enterprise calendar application) may be apprehensive about granting other users (trusted friends and family included) access to their calendar as they consider the data therein to be private. Further, personal or corporate privacy concerns may constitute a bar to gaining meaningful access to certain calendar and personal availability information. Additionally, granting access to a calendar may constitute an administrative issue as these grants typically do not expire. As such, an individual may be required to continually review who has access to their calendar and determine whether such grants of access should continue.

Yet another problem encountered with respect to event planning is who is actually required at an event. A friendly event such as a family reunion may represent a simple invitee determination—parents, children, grandparents, aunts, uncles, and so forth. More formal events—especially those in the workplace and that may be subject to the "chain of command" and workplace egos—become increasingly complicated and dicey. For example, while only a core group of three low level engineers may be required to work on a new software specification, a middle-manager for that engineering team may insist on attending all meetings while failing to contribute anything substantive at such meetings. Failure to invite that manager, however, may result in a bruised ego and could realistically have workplace consequences with regard to future work assignments. Further, a senior manager may have requested to be cc'd on all group e-mails and meeting schedules as a courtesy and to remain in the know while making it known he has no intention of attending engineering team meetings.

But when planning that aforementioned meeting between the three engineers (necessary invitees), the middle-manager (required but non-contributing invitee) and senior-manager (courtesy invitee who will not attend), presently available calendar applications do not utilize information concerning the priority or contributions of the invitees with respect to determining a suitable meeting time for the subsequent issuance of a meeting invitation. As such, a review of the availability of these five persons when only three are actually necessary to the meeting may result in a display of substantially less available meeting times than if only the calendars of the three necessary invitees were consulted.

A still further problem encountered with event planning is that it does not occur in real-time and may give rise to issues concerning stale calendar data. For example, various indications of event availability may be exchanged via electronic mail, voice mail, live conversations, disparate calendaring systems and so forth. By the time the event organizer collects the availability data for all invitees and gets around to scheduling the event, some of the availability data that was provided may no longer be valid (e.g., during the interim, a particular person scheduled another event). Keeping the event organizer up-to-date with invitee availability burdens the event organizer and various attendees with the need for intermittent verifications as to whether a previous indication of availability remains open at present.

There is a need in the art for invitees to provide temporary and limited calendar access to an event planner such that invitees expose only the portion of their calendar that is relevant to the event being planned. There is a further need of a means to provide information relevant to availability of necessary event attendees without surrendering personal privacy or business confidences. There is, too, a need to provide temporary and limited calendar access without regard to a particular calendaring application or related hardware platform. There is an additional need to provide such temporary and limited calendar access in real-time such that an event may be planned and confirmed without the immediate need for user intervention and confirmation.

SUMMARY OF THE INVENTION

An exemplary embodiment of the present invention provides a system for scheduling an event. A first computing sub-system associated with an invitee may include calendar data and a calendar data acquisition module. Alternatively, the computing sub-system device may simply have access to such data. A second computing sub-system associated with an event planner may access at least a portion of the invitee calendar data aggregated by the calendar data acquisition module. Access to that calendar data may be limited to a non-zero finite set of closed time intervals as permitted by the invitee. The finite set of closed time intervals may include a starting date and an ending date; at least one day of the week within the starting date and the ending date; and/or a starting time and an ending time.

In some embodiments of the present invention, event planner access to the non-zero finite set of closed time intervals expires. That expiration may be the result of an event being scheduled or may occur as the result of a scheduled event. In further embodiments, event planner access to the aforementioned calendar data may be limited to only those portions of the finite set of closed time intervals that occur in the future. The non-zero finite set of closed time intervals may further reflect an availability of the invitee for the event to be scheduled.

In another embodiment of the present invention, an exemplary method for granting access to calendar data associated with a non-zero finite set of closed time intervals is disclosed. The exemplary method may include identifying a start date and end date from a pool of available calendar data; identifying at least one day of the week within the aforementioned start and end dates; and defining a time interval for at least one day of the week within the starting data and the ending date. A party such as an event planner may then be granted access to at least a portion of that calendar data subject to the aforementioned non-zero finite set of closed time intervals as defined by the time interval for the at least one day of the week within the range of dates.

Further embodiments of this exemplary method may include granting access to an event planner, wherein the event planner is granted access to the calendar data subsequent to a request by the event planner to schedule an event. The party granted access to the calendar data may, in some embodiments, be sent a calendar access message associated with grant of access to the calendar data. That message may include a keyed uniform resource locator associated with a secure user interface.

Various embodiments of the aforementioned method may further include the steps of accepting a time proposed for an event by an event planner, the proposed time falling within at least one of the non-zero finite set of closed time intervals; adding the event to the calendar data of the party granting access to the calendar data associated with a non-zero finite set of closed time intervals; and/or sending a confirmation to the event planner of having added the event to the calendar data of the party granting access to the calendar data.

In yet another embodiment of the present invention, a computer-readable medium such as an optical disc, a memory card, or a computer disc is provided. That medium may comprise instructions that, when executed, perform a method for granting access to calendar data. The method may include receiving a request for access to calendar data, the request initiated by a computing device coupled to a network; aggregating a portion of calendar data, the portion of calendar data limited by a non-zero finite set of closed time intervals as defined by the owner of the calendar data; delivering the portion of the calendar data over the network to the computing device that requested access to the calendar data; and updating the portion of the calendar data pushed over the network, the updates to the calendar data occurring substantially in real-time.

In a still further embodiment of the present invention, a system for scheduling an event is disclosed. The system may include a first computing sub-system associated with an invitee to the event to be scheduled, the invitee computing sub-system including calendar data; and a second computing sub-system associated with an event planner for the event to be scheduled, the event planner computing sub-system being configured to access at least a portion of the invitee calendar data, wherein event planner access expires. In some embodiments, expiration may occur as a result of the event being scheduled. In other embodiments, expiration may occur as a result of the scheduled event occuring. In yet another embodiment of the aforementioned system, the invitee calendar data includes calendar data reflecting an availability of the invitee for the event to be scheduled.

BRIEF DESCRIPTION OF THE DRAWINGS

FIG. 2 illustrates an exemplary invitee-end calendar interface as may be displayed to an invitee with respect to offering temporary and limited grants of calendar data to an event planner in accordance with one exemplary embodiment of the present invention.

FIG. 4 illustrates an exemplary event planner-end calendar interface as may be displayed to an event planner having received various temporary and limited grants of calendar data from one or more users in accordance with an exemplary embodiment of the present invention.

DETAILED DESCRIPTION

Figure 1:
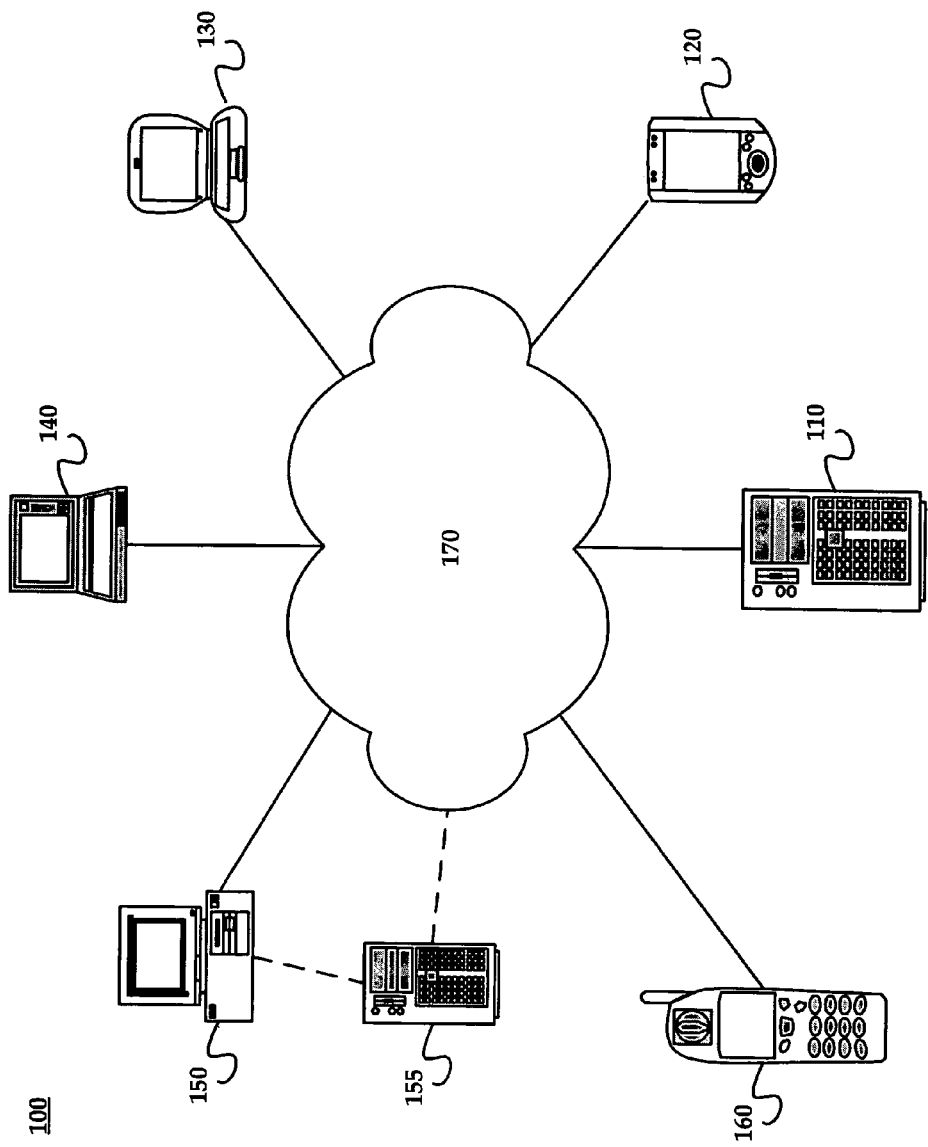
FIG. 1 illustrates an exemplary network of computing devices with varying degrees of calendar functionality in accordance with an exemplary embodiment of the present invention.

FIG. 1 illustrates an exemplary network 100 of computing devices with varying degrees of calendar functionality in accordance with an exemplary embodiment of the present invention. A variety of computing devices may be utilized in the practice of the present invention such as a personal digital assistant (PDA) 120, a variety of laptops (130 and 140), a desktop computer 150, and a cellular device 160. Other computing devices may also be implemented within the context of various embodiments of the present invention (e.g., thin clients, workstations, and portable handheld computing devices).

The functionality offered by an embodiment of the presently described scheduling application and related service may be used without particular limitations as to hardware device (e.g., desktop versus laptop versus PDA), software (e.g., calendar application or operating system), or means for connecting to communications network 170. For example, one device (e.g., PDA 120) may connect to communications network 170 using a wireless connection and an 802.11x protocol. Laptops 130 and 140 may connect to communications network 170 utilizing a cable modem and dial-up connection, respectively. Desktop computer 150 may connect utilizing a digital subscriber line (DSL), and cellular device 160 may communicate over the communications network 170 using the General Packet Radio Service (GPRS) and available radio spectrum.

Communications network 170 may comprise various communications facilities and mediums (e.g., telephony, wireless, satellite, cable, optic, and so forth) as may be provided by telecommunications companies and Internet Service Providers. Communications network 170 may be a geographically widespread network (e.g., a Wide Area Network (WAN)), like the Internet that depends upon the aforementioned communications facilities to link various network segments. The communications network 170 may also be or be comprised of smaller linked communications networks such as Local Area Networks (LANs). A LAN may be comprised of a group of computers and other devices dispersed over a relatively limited area and connected by, for example, a variety of broadband communications links. LANs may take on a variety of configurations including server-client, peer-to-peer, peer groups, or a combination of the same. Communications network 170 may also be a closed, proprietary network.

In some embodiments of the present invention, the various computing devices may not be immediately connected to the communications network 170. For example, and as shown with respect to desktop computer 150, an intermediate computing device such as a centralized or enterprise server 155 may intermediately couple the computing device 150 to the network. Various ancillary applications (e.g., enterprise applications or firewalls) may be implemented on the enterprise server 155 to allow for or enhance certain end-user functionality. Similarly, PDA 120 may be coupled to the communications network 170 via a Wireless Access Protocol (WAP) gateway. Various other devices, such as Personal Client Servers (PCS) or Smart Device Servers (SDS) may be implemented dependent upon the particular nature of a device and/or a particular network connection. Similarly, and as generally noted with regard to communications network 170, any variety of access points and routers may be implemented to provide communicative coupling with respect to the communications network 170 and various devices communicating over the same.

Additionally, a communicative coupling to the communications network 170 may not be immediately present in the sense that a device may temporarily lack a connection (direct, intermediate or otherwise) to the communications network 170. For example, a user may be using their laptop on an airplane, which may lack the means to connect to a communications network 170. Notwithstanding, a data acquisition module (as discussed herein) and as may be implemented in various embodiments of the present invention may not require a present connection when either an invitee or an organizer accesses their respective system and/or interface.

In an embodiment of the present invention, each computing device (120, 130, etc.) in the network 100 may be configured with one or more calendar applications (e.g., software offering a calendar function). For example, PDA 120 may be configured with a Palm OS® calendar application such as "DateBk5" from Pimlico Software. Similarly, laptop 130 may be configured with "iCal 2.0," a personal calendar application from Apple Computer, Inc. Laptop 140 may utilize a web-based calendar function such as "Yahoo!® Calendar" accessible through the Yahoo!® web portal. Desktop computer 150 may utilize Microsoft Corporation's "Microsoft® Office Outlook®," which also offers electronic mail (e-mail), contacts, notepad, and to do list functionality. Finally, as may be the case with some computing devices, no calendar application may be present at all.

It should be noted that any of the aforementioned calendar applications may be utilized in the practice of the present invention. Other applications not specifically listed may also be utilized. Further, as can be seen from the exemplary applications identified above, embodiments of the present invention may operate across various operating systems (e.g., Palm OS® for PDA 120 versus Mac OS X for laptop 130 versus Microsoft® Windows™ for desktop 150).

The aforementioned cross-platform operability (with respect to calendar applications and operating systems and, to a further extent, particular hardware implementations) may be achieved through the use of various data and/or information processing standards such as the iCalendar standard for calendar data exchange. Cross-platform operability may also occur through various proprietary interfaces. For instance, the iCalendar standard is embodied in the RFC 2445 and the RFC 2445 Syntax Reference, the disclosures of which are incorporated herein by reference. The reference to the iCalendar standard should not be confused with iCal, which is the product name of the Apple Computer calendar program that also happens to implement the iCalendar standard. For the sake of clarity, any further reference to the Apple Computer calendar application will be identified as the iCal calendar application whereas references to the iCalendar standard will be identified as the iCalendar standard.

The iCalendar standard allows users of a particular calendar application to send meeting requests and tasks to other like-users through e-mail. The iCalendar standard may also be used to describe an individual's entire calendar of events. Additionally, the iCalendar standard may be used in event requests in e-mail wherein only a single event may be described. A recipient of an iCalendar standard e-mail, with supporting software, may then respond to the sender of that e-mail either through acceptance of the meeting request or through a counter-proposal as to a meeting date or time. While iCalendar standard data may be exchanged using e-mail, the standard is also designed to operate independent of any particular messaging transport protocol.

It should be noted that the various embodiments of the presently described invention are not dependent upon the use of the iCalendar standard. While the iCalendar standard may be used in some implementations of the present invention, a software module may be utilized wherein proprietary calendar data may be converted to the iCalendar standard or some other data format. For example, Microsoft Outlook uses the iCalendar standard for event invitations but does not allow access to actual calendar data in the iCalendar standard. Through the use of an intermediate software module providing for translation of proprietary calendar data to another particular standard, a user may gain access to a particular user's Outlook calendar data. Notwithstanding, various proprietary calendar standards may be used (either directly or through an intermediate format conversion) in the practice of various embodiments of the present invention.

Further, while the iCalendar standard is designed to describe calendar-based data such as an event or set of events, the. iCalendar standard may not describe what to do with that data. A companion standard—for example, the iCalendar Transport-Independent Interoperability (iTIP)—may define a protocol for exchanging (for example) iCalendar standard data objects for the purposes of group calendaring and scheduling. The iTIP standard is embodied in RFC 2446, the disclosure of which is incorporated herein by reference. Another standard—the iCalendar Message-Based Interoperability (iMIP)—defines a standard for implementing the iTIP standard on ordinary Internet e-mail-based transports. The iMIP standard is embodied in RFC 2447, the disclosure of which is incorporated herein by reference. Some calendar applications may require additional software modules or scripts for the purpose of calendaring in non-Gregorian calendars (e.g., the Hebrew calendar and the Japanese Emperor-based calendar) wherein the CALSCALE values that define the calendar scale with respect to iCalendar standard data are specified.

Through use of the aforementioned iCalendar standard or other appropriate calendar format standard including any variety of proprietary interfaces and a calendar data acquisition module (not shown but further described herein), calendar data may be exchanged amongst the variety of calendar software applications and related hardware platforms/computing devices in network 100. The calendar data acquisition module is a software application that collects calendar data from various calendaring applications so that the availability of an invitee to an event may be determined.

In some embodiments, the calendar data acquisition module may be configured to automatically search for iCalendar standard or some other type of calendar data on a user's computing device. In other embodiments, the acquisition module may be configured to search at the default location for a particular calendar application (e.g., in Microsoft Outlook, calendar data is often stored by default at C:\My_Outlook_Files). In still further embodiments, the user may be required to provide the particular location of calendar data or a particular calendar application being used so that data may be accessed by the acquisition module. The acquisition module may further be configured to be altered from a default setting by a particular user to any of the aforementioned operating modes (i.e., user or preferred settings).

Some calendar applications may allow the calendar data to be hosted at a user-specific Uniform Resource Locator (URL), which is the address of a particular resource on the Internet. Through a URL, calendar data (the resource) may be made available to any computer connected to, for example, the Internet. In such an example, the data acquisition module may be configured to access the calendar data at the specified URL.

In one embodiment, the data acquisition module operates in a client-server configuration wherein the data acquisition module is installed on the device where the calendar application is installed. The acquisition module may periodically collect calendar data such as a person's availability or busy time from the calendar application (subject to particular availabilities) and load this information onto a server 110 or other host computing device via, for example, the Internet or a LAN. A user may have multiple calendar applications and, as such, corresponding data acquisition modules. The server 110 may merge the data from the multiple modules for a particular user. A user interface to the server 110 may also allow the invitee to share a subset of calendar data (e.g., data reflective of availability) with organizers of various events.

The acquisition module may further operate in conjunction with or be an integrated module in a scheduling software application that generates an interface for providing access to user calendar data or for displaying received calendar data. For example, a user may receive calendar data in an iCalendar standard or other calendar data format from another user via the acquisition module at their particular device. This receipt of data may occur through any variety of push or pull operations, polling, or intermittent scheduling operations. That received calendar data may have been received over network 170 from another user who provided the calendar data via their acquisition module installed and operating at their particular computing device. An interface or scheduling application, which may be linked to the acquisition module (e.g., via modular programming and various linking libraries) or directly integrated with the same (e.g., part of a larger proprietary software application) at the receiving user's computing device may then take the received calendar data and display it in a format that is comprehensible to the user much in the way that Microsoft Outlook or other calendar applications display their particular calendar data.

In some embodiments of the present invention, the calendar data acquisition module may be a free software application made available through a publicly accessible server connected to the Internet and offering various software offerings through a web interface such as CI Net's download.com. The publicly available server may be hosted by a provider of a scheduling service. In this way, users may freely access the aforementioned acquisition module (or integrated scheduling application) that allows for the acquisition, sharing, and display of calendar data.

Through this 'freeware/shareware' availability, word-of-mouth may allow for the widespread deployment of the acquisition module and any related software application or service. The 'free' acquisition module may, however, offer only limited functionality as compared to a pay-model acquisition module. For example, the 'free' module may offer only the ability to share calendar data. The user may be required to subscribe to a service or pay for a more developed application that offers, for example, scheduling functionality or other special features. The module may also be obtained through, for example, an FTP transfer or on a machine-readable medium (such as an optical disc) for installation.

Various business models may be implemented with respect to availability of the acquisition module and any related software modules. For example, a scheduling service may be offered that includes the data acquisition module for free as a marketing strategy to create awareness and familiarity of the service or, for example, a user interface. Similarly, the data acquisition module may be part of an integrated calendar system requiring a paid subscription.

In another embodiment of the present invention, the server 110 may host the acquisition module as part of a scheduling and calendar service. In such an embodiment, the server 110 via acquisition module may be provided for pulling calendar data from a user's computing device and manage that data centrally at the server 110 through, for example, storage, translation, and the like. In such an embodiment, the server 110 may identify a particular user's or enterprise server's (e.g., server 155) Internet Protocol address. This aggregated calendar data may then be accessed centrally at server 110 by another user or, alternatively, distributed to users by the server 110 through a subsequent data exchange. Further, the acquisition module may operate in a binary combination wherein a particular module at a user's computing device operates in conjunction with a data management application at the server 110 to provide calendar access to various users of the system through centralized access and/or data distribution.

The calendar data acquisition module may also be installed in a variety of other configurations that allow for collection of calendar data for a particular user and subsequently makes that data available to, for example, a calendaring service or system. For example, the module may be installed on a centralized enterprise server like server 155 whereby various users in a corporate enterprise have access to the module and related functionality. Further, the module may be directly integrated with a particular software application such as Microsoft Outlook. The present scheduling application and acquisition module may also be integrated as a part of other third-party applications.

Various user interfaces may be utilized that offer the necessary functionality for providing, for example, temporary and limited access to a user calendar and the calendar data therein. As such, the present invention is not intended to be (nor should it be) limited by the use of any particular interface. FIG. 2 illustrates an exemplary invitee-end calendar interface as may be displayed to an invitee with respect to offering temporary and limited grants of calendar data to an event planner in accordance with one exemplary embodiment of the present invention.

For example, in one exemplary embodiment of the present invention, a user of the presently disclosed scheduling service may receive a request from an event planner or another event invitee concerning the scheduling of a particular event, for example, a gathering amongst family members. This request may occur via a direct e-mail request (e.g., "we need to get together for dinner; when are you available?"), an oral communication as may occur through a face-to-face meeting or a telephone call, or in some embodiments, an instant messaging application, or as part of an integrated software application or service offering scheduling and calendar access functionality such as those described herein. Various means of receiving a scheduling request are within the scope of the present invention.

Generally, a scheduling request (notwithstanding its particular form) will identify a preliminary range of dates for the event, referred to as candidate dates. The request that initiates the various planning activities may come in the form of an e-mail that reads as follows:

To: Mom, Dad, Sister, Aunt, Uncle
From: Brother
Sent: Thursday, May 11, 2006, 6:50 AM
Re: Dinner
Hi all—
We need to get together for dinner, how about two hours?
  Aunt and Uncle are only in town until May 31. Can we get together before then? Please let me know.
  —Brother In this case, the dinner must occur no later than May 31 because of the pending unavailability of certain family members. Because the gathering must occur by May 31, the range of possible meeting times (the candidate dates) is May 11 to May 31. A recipient of the meeting request (one of the family members) may reply to the event planner (Brother) by using an embodiment of the presently disclosed scheduling application and a related user interface.

Through a user interface (such as that shown in FIG. 2), the invitee may log into an embodiment of the present scheduling service and create a new unscheduled event as is further discussed below. The invitee may provide the service with the organizer's e-mail address (for the purpose of delivering certain information), possible event locations, and any variety of other information as may be provided through, for example, a text-box for messages to the organizer. The invitee may then select a start date and an end date. Through the selection of the start date and the end date, the invitee provides a user-defined date range for the event planner's limited access to the invitee's calendar information.

After defining a date range, the invitee (through the user interface) may identify particular days of the week within that window of dates for event planner access. Thus, notwithstanding the invitee user having identified a limited date range spanning from, for example, May 11 to May 31, the event planner will only be granted, for example, access to Mondays, Tuesdays, Wednesdays, and Thursdays within that date range subject to the selection of those particular days. In this instance, the selected dates will limit event planner access to Thursday May 11, Monday May 15 through Thursday May 18, Monday May 22 through Thursday May 25, and Monday May 29 through Wednesday May 31.

Following selection of a date range and particular days within that range, the user invitee then identifies a time of day interval for event planner access. Through time of day interval access, an invitee user may identify a time of day for the start of the interval and a time of day for the end of the interval that will be shared with the event planner. For example, the invitee user may designate 5.00-10.00 PM.

Together, the set of times that is defined by the intersection of the date range, the particular days of week, and the specified time of day interval represents a time window that can be granted to the organizer so they can view the availability or other calendar data of the invitee for the event they are planning. The invitee can specify multiple windows of time for a given event as necessary to summarize the times he/she wants to share their availability for that event. Together, these windows represent the availability that is to be exposed to the event organizer to help them schedule the event. Through the selection of particular days and times of calendar access and, if present, additional security limitations, the invitee user may provide the event planner with a limited grant of calendar access.

It should be noted that references to an event planner having access to a particular user's calendar data (e.g., Wednesday and Friday from 9.00 AM to 4.00 PM) should not be interpreted in that an event planner may only view that data on Wednesday and Friday from 9.00 AM to 4.00 PM. Instead, only the invitee's calendar data that falls within the granted time windows will be made available to the event planner to view. As such, the event planner may view the data on any day but will only have access to the data that appears on the invitee's calendar in the specified time window(s) (for example, on that Wednesday and Friday between the hours of 9.00 AM to 4.00 PM).

It should also be noted that in some embodiments of the present invention, the event planner's access to the calendar data is not retroactive. For example, if an event planner is granted access from 9.00 AM to 4.00 PM on a Monday, Tuesday, and Wednesday but the event planner is viewing the data on Tuesday at 2.00 PM, the event planner may not be able to view the calendar data that appeared on Monday from 9.00-4.00 or that appeared on the present Tuesday prior to 2.00 PM. There is no reason for the event planner to access that calendar data in that the calendar data is now irrelevant as the event cannot be planned in the past. Alternatively, all time prior to the current time (or particular segments thereof) may be marked as 'not available' for the corresponding invitee. In this way, limited access grants may be temporary in that they naturally expire as time advances. Access grants may also be made temporary through the automatic expiration of the grant upon the scheduling or completion (e.g. occurrence) of the event.

Additional security settings like the aforementioned real-time expiration of calendar data may be implemented within the scope of the present invention. For example, a user may grant calendar access on a particular day and between a particular start and end time but designate certain information as off-limits notwithstanding its presence within that date and time range. This may be of particular use when a calendar user happens to schedule both personal and professional information on a single calendar. As such, the calendar user may designate certain events on their calendar as 'personal,' 'family only,' 'business only,' or 'off limits.' Various other security indicia may be implemented such as numerical values, additional descriptive titles (e.g., 'project team only'), or color coding. The calendar user may also maintain multiple calendars with separate security settings for each such calendar.

The user may, through the aforementioned classification security limitations, cause certain event data to be excluded from display to an event planner or other observer of the calendar data. Similarly, the user may grant (versus deny) particular users certain levels of access. For example, a supervisor may be granted access to 'business only' or 'project team only' calendar data just as a family member may be granted access to all 'personal' or 'family only' data. These security settings may be set in advance of a calendar data access request (e.g., as part of a user preference) or may be implemented on a request-by-request basis.

Subject to a particular security setting or classification, information that is shared with an event planner may be filtered such that the event planner never receives detailed data related to a particular scheduled event or appointment. Alternatively, the data may not be filtered but otherwise 'blacked out' such that the event planner cannot access the specifics of the calendar data. In some embodiments of the present invention, the scheduling application and service described herein may prevent the delivery of certain calendar data via data acquisition module if to do so would violate a particular security setting. These embodiments are in addition to the aforementioned temporary and limited grants of invitee availability.

Through, for example, an invitee-end control panel (like that in FIG. 2), an invitee user may indicate that they wish to add additional temporary and limited windows of calendar data access, remove particular windows of access, or grant pending calendar access windows to the particular event planner or planners. For example, a user may decided that an additional window of access should be granted whereby the user may press an 'add' button through the use of a mouse or other input device coupled to a computing device operating the present scheduling application or click on a hyperlink offering similar functionality (e.g., 'Add a New Time Window'). After clicking on an 'add' option or similar functional interface tool, a new calendar interface may be generated to allow for the user to provide the necessary additional access information. Alternatively, a user may decide to remove a particular window of access. In this case a 'remove' option may be provided for each granted window. If the user is satisfied with pending windows of access to be granted (e.g., grants), the invitee user may then select a 'grant' button or similar interface tool wherein invitee calendar availabilities are provided to the event planner. Various other interface means may be implemented in the practice of the various embodiments of the present invention.

In some embodiments of the present invention, additional information may be illustrated in an invitee-end interface. For example, information concerning the event planner may be displayed including the identity of the planner, certain affiliations of the planner (e.g., President of WorkCo. or family friend); contact information for the event planner (e.g., email or telephone); in addition to various security settings of the event planner who is about to be granted access (e.g., 'business only' information). This information may be manually entered or automatically populated from an address book application. Information concerning the date of the calendar data request, the nature of the calendar data request (e.g., for a party), and candidate dates (e.g., seeking to plan a meeting on Thursday or Friday of this week) may also be reflected.

In some embodiments of the present invention, a number of windows of calendar access as may be delivered to a number of event planners may be displayed in a single interface. That is, one set of calendar access information may relate to one event planner while another set of data may relate to another planner. In this way, the owner of the calendar data may attend to granting temporary and limited calendar access to a number of requesters (e.g., event planners) at one time. In one exemplary implementation, a user can be an invitee to multiple events. Hence, the invitee may have multiple limited grants outstanding. Each grant may be coupled to an event and the organizer(s) for the corresponding event. Additionally, there may be multiple invitees for an event that use a particular scheduling application or service that provides a temporary and limited grant of calendar access. These multiple grants may be merged by the organizer for ease of viewing and/or organization. Further, an organizer may arrange multiple events and have temporary and limited calendar access grants associated with each.

Figure 3:
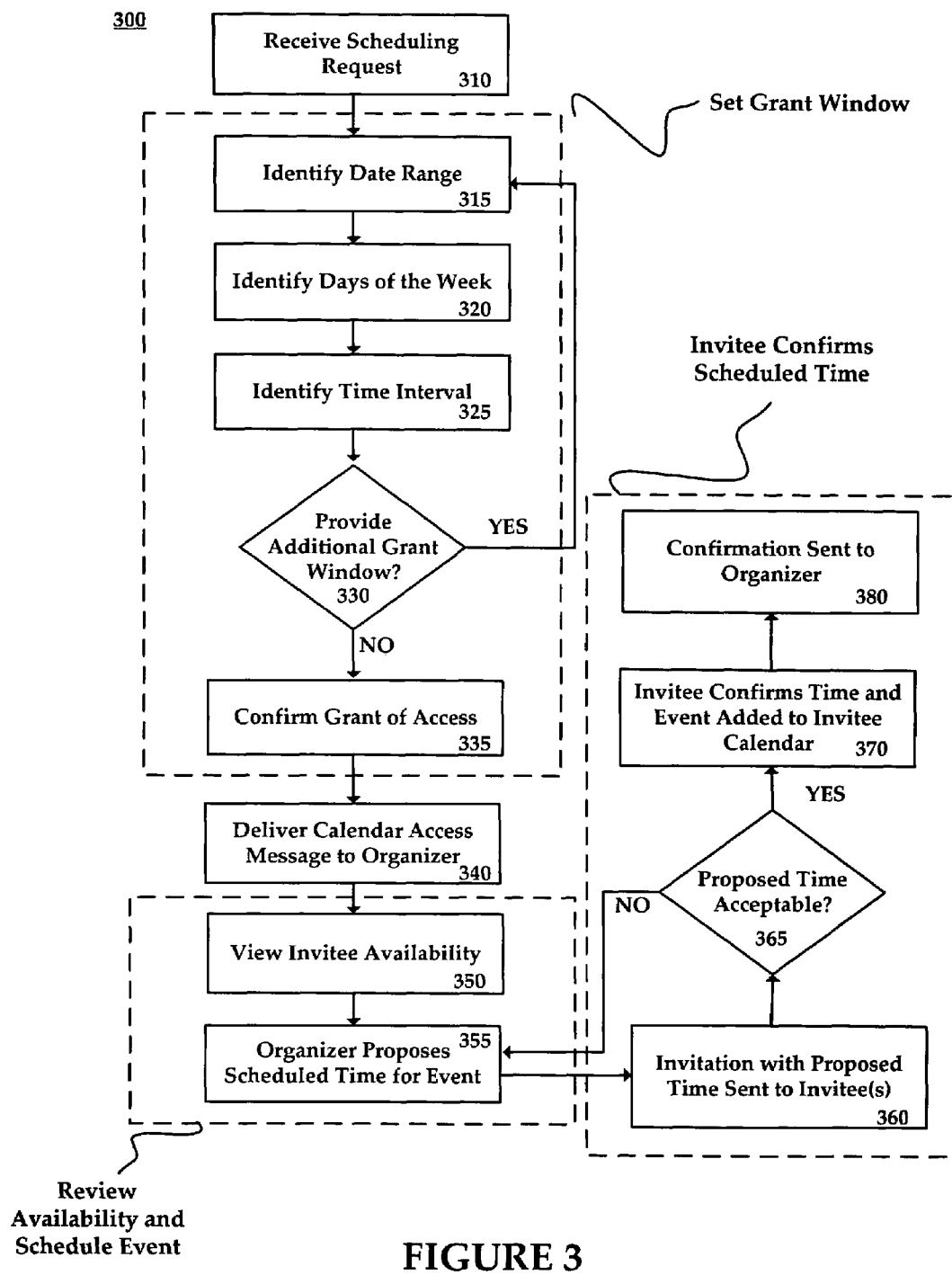
FIG. 3 illustrates an exemplary method for granting temporary and limited calendar access to an event planner in accordance with an exemplary embodiment of the present invention.

FIG. 3 illustrates an exemplary method 300 for granting temporary and limited calendar access to an event planner or other entity in accordance with an exemplary embodiment of the present invention. In step 310, a calendar owner (the invitee or a proxy of the invitee, which may be an administrative assistant or an automated calendar application) receives a request to schedule a meeting (a scheduling request). This request may be oral (e.g., face-to-face, over the phone), written (e.g., a letter or form letter seeking to schedule a meeting), or electronic (e.g., electronic mail, instant message, scheduling application/service specific or Short Message Service (SMS)). Any means to initiate the scheduling of a meeting may be utilized in the course of practicing the present invention although an electronic communique offers certain advantages as are further discussed herein. The request may include candidate dates and may further indicate an expected duration of the meeting.

As a part of setting a grant interval and after having received a request to schedule the meeting, a calendar owner/invitee may utilize an embodiment of the presently disclosed scheduling application and service to grant limited calendar access to the event organizer to allow the organizer to view the invitee's availability for specific intervals of time that are relevant for planning the event. Step 315, specifically, concerns the identification of a date range wherein the calendar owner might meet (e.g., the second and third weeks of June). This block of dates (book-ended by a start date and an end date) may correspond to the aforementioned candidate dates initially identified by the event planner.

In step 320 (also a part of setting a grant interval), after having identified a date range in step 315, the invitee identifies particular days of the week within that date range to meet (e.g., Monday through Friday). In step 325 (also as a part of setting a grant interval) the invitee identifies an interval of time for which the invitee wishes to grant event planner access to calendar data. This time interval may be consistent with times at which the organizer may wish to hold the event. The intersection of the range of dates, days of the week, and interval of time represents a 'grant window' where the invitee intends to give access to the organizer so the organizer can view the invitee's availability or other calendar data. If the data is irregular and non-repeating or the time intervals are non-contiguous (e.g., lunch and dinner), the invitee may choose to specify an additional 'grant window' at step 330. If such an additional 'grant window' is selected, the invitee proceeds to specify the additional window of granted calendar access by repeating steps 315, 320, and 325. If the data is regular and repeating or limited in that additional windows of granted calendar access are not required, the user proceeds to step 335 wherein the grant windows are confirmed. Steps 315, 320, 325 with respect to identifying a date range, days of the week and a time interval, respectively, and step 335 with respect to confirming a grant of access represent one of many exemplary methods for specifying what intervals in time that the invitee may grant calendar access to the organizer.

In some embodiments, an event planner may be aware that a particular invitee uses a calendar application and/or service embodying the various functionalities described herein. In such an embodiment, the invitee may have previously shared with the organizer a personal Uniform Resource Locators (URL) associated with such a service. Alternatively, the organizer may be able to access a general URL associated with the aforementioned service and specify the specific identification of the invitee. Having accessed a portal associated with a particular invitee, the organizer may proceed to request an event and specify the specific calendar window(s) where they would like to have access for the purpose of scheduling the event thereby alleviating the invitee from transcribing this information from an email or other message. The invitee may then receive the request through such a service and may select a 'grant' button or other interface tool to give the organizer access or may edit the list of windows in the same manner as described in steps 315, 320, and 325.

Additionally, an individual may configure a scheduling service to automatically grant such requests from specific 'trusted' individuals. These automatic grants may be limited to certain days of the week, hours of the day, and so forth. Requests falling outside these times may thus require invitee confirmation. Automatic grants may also require that the organizer be authenticated. This may be done through requiring that the organizer provide their e-mail address. An authentication e-mail may be sent to that particular address with a keyed URL that the organizer may be required to select before any calendar access grants are provided. The organizer may also have their own account associated with such a service in which case authentication may occur through standard login/password procedures.

Text recognition capabilities associated with an invitee's e-mail account may also be provided such that when an e-mail is received from an event planner with certain keywords in certain linguistically relevant or indicative combinations (e.g., Boolean configurations such as 'need,' in the same sentence as 'schedule' and 'meeting' within the same message body as 'when,' 'you,' and 'available'). Upon identifying a message as a meeting request, the invitee's scheduling application may automatically generate a calendar access grant request to the invitee. The grant may then be sent to the organizer upon confirmation by the invitee or automatically based security settings that the invitee may have previously configured for that organizer.

In any of the aforementioned examples, a grant of calendar access may be delivered to the organizer in step 340. In step 340, the scheduling application and service described herein may send a calendar access message to the event planner. In some embodiments of the present invention, the calendar access message sent by the scheduling application of the invitee may be the direct result of the scheduling application or may be a result of the scheduling application's interaction with another software application such as an e-mail application. An example includes sending an e-mail with a text message and a 'keyed' URL that is unique to the organizer and the event so that when the organizer accesses that URL, the aforementioned service may automatically configure itself to access a particular event with respect to an organizer who is associating the same. Alternatively, the same message may be delivered to an organizer via non e-mail messages; for instance, as part of a service, an event inbox may be maintained for these and other notifications related to events.

In step 350, the entire grant window may not be presented to the organizer. For example, rather than show availability of the invitee for the entire grant window, the service may elect to propose a collection of times inside the grant window where the invitee is available. The service may then negotiate directly with the organizer for other times within the grant window if the proposed time(s) are not acceptable to the organizer.

In other embodiments of the present invention, the calendar access message may be sent by a centralized server (110) at the request of the user's resident scheduling application or the user having accessed an enterprise scheduling application offering the presently described temporary and limited calendar access functionality on an enterprise server. The centralized delivery of the calendar access message may be useful as to prevent spam filters or firewalls from filtering out or identifying particular calendar access messages or e-mails from particular users of the presently described scheduling application as spam or some other type of malicious e-mail.

Figure 4:
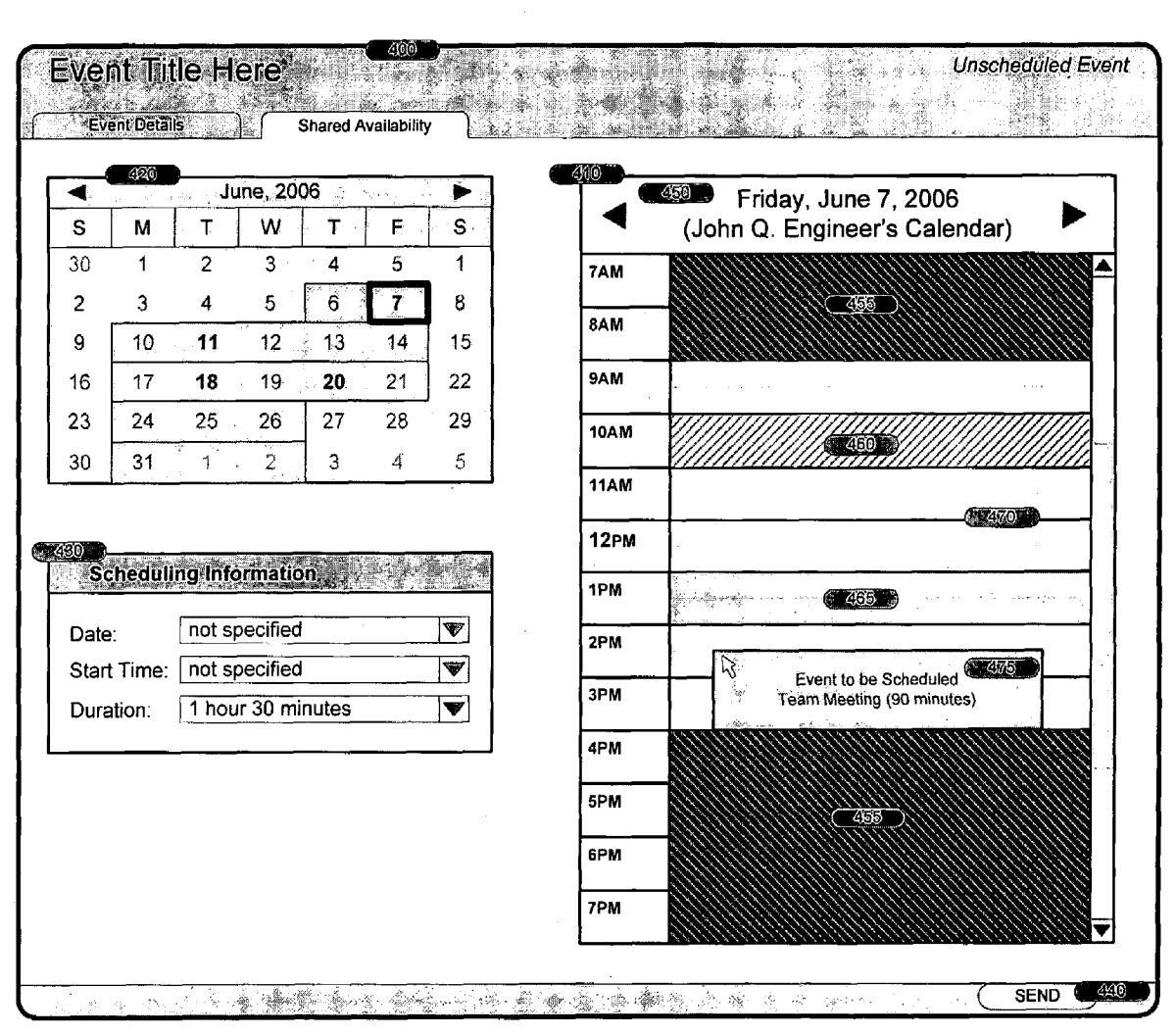

The calendar access message, in some embodiments, may contain the aforementioned keyed URL wherein redirection to the URL results in the launch of a secure user interface like that described in FIG. 4 via a web browser. In other embodiments, the calendar access message may comprise an executable file link such that clicking the link causes the launch of the event planner's scheduling application. In some embodiments of the present invention, simply clicking on (opening) the calendar access message itself will cause the execution of a script that results in the launch of the appropriate scheduling application and/or a related interface. Launching or opening of the calendar access message as described above occurs in step 350 as a part of reviewing invitee availability and scheduling an event.

The calendar access message may further comprise additional information that may be of interest or use to the event planner or other recipient of the message. For example, the calendar access message may be accompanied by text, Rich Text, or HTML advertisements for various products or services. The calendar access message may also be accompanied by a personalized message generated by the user providing temporary and limited calendar access. Certain identifying or otherwise useful information may also be presented in the subject line of the calendar access message (e.g., Availability for Engineer X for Team Meeting Request).

It should be noted that in some instances, the presently disclosed scheduling application may be possessed or subscribed to only by the party granting calendar access (i.e., the invitee) and not necessarily by the party organizing the event (i.e., the event planner). As such, the event planner may be wholly unaware of a software application or related service implementing the presently disclosed scheduling functionality prior to the invitee providing temporary and limited calendar access to the event planner thereby making the event planner aware of the same through the aforementioned calendar access message. The calendar access message may further include information allowing the event planner to use the service or application for organizing the corresponding event. In this case, the service or application may assist the organizer by collecting the availability information for all invitees and providing a central place where the organizer and all invitees can collaborate for the purpose of planning and distributing the event details whereby the organizer spreads awareness of the particular service to the invitees.

Gaining access to the module and/or scheduling application by the event planner may occur through clicking a hyperlink that implements download of the software, downloading an attached installation application, or visiting an informative website. That website may include more information concerning the present scheduling application and related service and means for implementing the same. Alternatively, the link may allow the event planner or other entity to access a secure web site interface enabled by, for example, server 110 to utilize certain features of the present scheduling application.

If the event planner elects to join the scheduling service and/or to implement and install the necessary scheduling software applications for utilizing the same, the event planner may then send out a proposed scheduled time (or collection of proposed times) for the event at step 355. This proposed scheduled time (or collection thereof) may be sent to all invitees with respect to a particular event or only the invitees presently utilizing the disclosed scheduling application and service. An access portal to the event details (e.g., proposed scheduled times) may be provided to non-members through a message from the organizer that contains a keyed URL where the key is unique for each invitee and identifies both the invitee and the corresponding event. The non-member access portal, which may be hosted by server 110, may allow the non-member to manually enter times when they are available for the event.

A proposed scheduled time or collection of times sent to non-users of the presently disclosed scheduling application and service may also comprise the necessary instructions or further information to allow for installation and use of the present scheduling application (e.g., a URL link directing the recipient to additional information about the service or application and/or instructions on how to join the service and/or obtain the application). As members of the service, these invited users may then define windows in time on their calendar where they grant access to the event organizer using, for example, the method described herein.

In this way, the awareness and use of the scheduling application may naturally spread amongst a larger networked community of users as those who find the service useful will likely use it for future events and hence will continue to spread awareness and use. The fact that the service may be originated by the invitee (as opposed to the originator) may increase the likelihood that at least one participant of a given event will be a user of the service and, hence, increase the likelihood that the service will be used for planning the event when compared to services that are pure "organizer" focused.

After having accessed calendar data in step 350 through, for example, an interface like that described in FIG. 4, an organizer may propose a scheduled time for the event in step 355 as a further part of reviewing invitee availability and scheduling an event, the event planner now having more informative access to invitee availability than would necessarily be available and determined through, for example, a series of back-and-forth e-mail exchanges. Proposal of the time in step 355 may occur through the scheduling service or as through an e-mail, telephone call or other form of communication outside the operation of the present scheduling service.

In some embodiments, an event planner may aggregate various calendar data as provided by a series of invitees into a single calendar display. Alternatively, the event planner may cycle through the provided calendar data as is necessary. In such a case, each invitee's calendar data may be displayed separately from other invitees' calendar data (i.e., not integrated into a single calendar but possibly multiple calendars displayed on a single page).

In some embodiments of the present invention, the present scheduling application may be integrated with third-party applications for the purpose of providing additional and/or more accurate calendar data. For example, an invitee may be present at one location at 10.00 AM, the time at which a previous engagement ends. This example may occur in the context of an integrated service instead of reliance on a third-party application. The user may then have another engagement scheduled at 11.00 AM at a second location. Thus, it may appear that the invitee has an available block of one hour between 10.00 AM and 11.00 AM and an event planner may seek to schedule, for example, a meeting during that one hour.

The invitee's calendar may not, however, reflect that the invitee must travel for a period of 45 minutes from the first location to the second location. Thus, despite the available 1 hour block of time, the invitee is, in fact, unavailable for all but 15 minutes between the first and second engagement. These 15 minutes may or may not be available depending on the location of the proposed event. For example, if it takes 30 minutes to get from an event that ends at 10 am to a proposed event, and then additional thirty minutes to get from a proposed event to an 11 am event, then no time will be available between 10 am and 11 am for the proposed event.

An application may be integrated to help resolve this false appearance of availability. For example, a travel time application plug-in may operate in conjunction with the present scheduling application to identify the first address and second address and calculate a travel time to/from the proposed event. The busy time for all events may be increased to account for this travel time. The organizer may not be aware that this busy time is associated with travel time. To utilize such functionality may require the event planner to enter an address for the location of the proposed event. The application, in light of updated travel times or estimated travel times may then calculate the predicted travel time thus showing the true availability of the invitee for an event at the proposed location. This plug-in or integrated application, in addition to automatically reflecting travel times, may also prevent (or at least warn) an event planner if the planner attempts to schedule an event in a false period of availability. Various other application integrations are within the scope of the present invention that may assist in clarifying false reflections of availability (e.g., more accurately identifying 'busy' time).

Applications may provide for further collaboration beyond scheduling. Examples may include allowing invitees to attach photographs after a party event or allowing invitees to attach a deck of Power Point slides prior to a company meeting. Additionally, a message board may be 'attached' to the event to allow invitees and the organizer to initiate and hold discussions. For instance, discussions could be held to determine food assignments for a 'potluck' party. Invitees and the organizer could participate in these discussions whereby participants could then be automatically notified when new discussions are initiated, new comments are added, or new content is attached to the event.

Such a message board may be part of a more general message board used for general discussions unrelated to events. The general message board may be organized into a hierarchy of discussions whereby a user could select an event to see the discussions related to that event. Discussions that are attached to events that are part of a repeating series (e.g., weekly status meeting) may be attached to a single occurrence or all occurrences. Additionally, after a discussion is initiated that is not associated with an event, it may later be determined that this discussion is relevant to an event. For example, in the course of a discussion, it may be determined that the participants should meet to discuss the subject in person. In this example, it may be useful to attach the discussion to the event. In general it may be possible to attach the same discussion to multiple events whereby a single discussion may appear in multiple places within the general discussion hierarchy.

In optional step 360, as part of a time scheduling confirmation operation, an invitation to the event may be sent through the scheduling service to the invitee(s). In step 365, a determination is made by the invitee(s) as to whether the proposed time from step 360 is acceptable. If the time is not acceptable, as may be reflected by a reply message or other communication from the invitee(s), the organizer may propose a new event time in step 355 with an invitation to the new event time sent as a part of an invitation in step 360. The invitee(s), again, then make a determination as to whether the proposed time is acceptable in step 365.

The proposed block of time as identified in step 355 may appear on each invitee's calendar as being marked 'tentative' with the event not becoming an affirmatively scheduled event until acceptance of that event by the invitee(s) occurs. In still further embodiments, the event planner may simply send out an e-mail or voice mail to various invitees indicating that the meeting has been scheduled without further use of the present scheduling application. An optional confirmation as to scheduling the event may be delivered to the planner from the invitees upon their acceptance of the event (step 370) in step 380.

Alternatively (versus steps 360-380), the proposed event for which an invitation was sent in step 360 may automatically be scheduled with the various invitees that provided the aforementioned calendar data. In some embodiments of the present invention, once the event planner identifies an available block of time common to all invitees, the event planner may schedule the event such that it appears in all the invitee's individual calendars and that block of time is no longer available for the scheduling of other events. Each invitee may separately configure their security settings for the event or for the event planner to allow the planner to schedule the event on the corresponding invitee's calendar.

FIG. 4 illustrates an exemplary event planner-end calendar interface 400 as may be displayed to an event planner having received various temporary and limited grants of calendar data from one or more users in accordance with an exemplary embodiment of the present invention. Calendar interface 400 may be launched in a scheduling application or through a web interface in response to an event planner having, for example, clicked on a link in a calendar access message from an invitee. The calendar interface 400 may also be accessed after the initial click-and-launch access through, for example, a list of available calendar grants in the event planner's scheduling application.

Calendar interface 400 of FIG. 4 corresponds (generally) to an access grant wherein the invitee had granted the event planner calendar access from June 6 to June 21, Mondays through Fridays and another window from June 24 to August 2 on Mondays, Tuesdays, and Wednesdays. This specific indication is reflected in navigation calendar 420. As can be seen in the calendar grid 410, the day view of Friday, June 7 (specifically) is displayed as reflected by calendar data owner block 450, which may identify the date in addition to the invitee whose calendar data is being displayed (e.g., John Q. Engineer, Friday June 7). If multiple-invitee calendar data is being displayed and integrated into a single calendar, the calendar data owner block 450 may reflect the names of the owners of the multiple calendar data or simply identify the calendar data as 'aggregated.' In this case, the busy time shading for each invitee may be semi-transparently overlaid so that portions of the calendar where multiple invitees are not available will appear darker.

Different views may be displayed depending on the preferences of the particular event planner. For example, all available views may be displayed, as may certain blocks of time and so forth although the present view of FIG. 4 is for a single-day view (7 am to 7 pm). A vertical scroll bar may be used if the entire day does not fit within the screen.

As can be seen in calendar grid 410, the block of time displayed is from 7.00 AM to 7.00 PM. The invitee that provided the present calendar data, however, only granted access from 9.00 AM to 4.00 PM. As such, any time and related calendar data before 9.00 AM and after 4.00 PM is color or pattern coded as unauthorized calendar data 455. Calendar data to which access has been granted and the invitee's calendar data shows as available, however, may be color coded as white background on the calendar as shown on available time 470 that spans from 9 am to 10 am, from 11 AM to 1 PM, and from 2 pm to 4 pm. Calendar grid also reflects tentatively unavailable calendar data 460 in addition to unavailable calendar data 465. In the case of tentatively unavailable calendar data 460, the invitee may have tentatively scheduled an event and thus it is not known if the invitee will be available for the event being planned by the organizer.

A navigation calendar (such as navigation calendar 420) may be provided that allows the event organizer to select different dates for display in a calendar grid. In such an embodiment, the navigation calendar may display one month at a time. The organizer may click on a date in the navigation calendar with, for example, a mouse to cause data for the corresponding date to be loaded into a calendar grid. The user may advance forward or backwards to different months by, for example, clicking on a left and right arrow button at the top of a navigation calendar although various navigation techniques may be implemented subject to a particular navigation interface. The navigation calendar may also provide cues as to assist the event organizer find a date where the invitee(s) are available for the proposed event. Shaded dates that are boxed in may represent dates where the invitee has shared some of their calendar data. Dates in bold may represent dates where the invitee's calendar data shows that the invitee has enough free time for the event.

A scheduling assistant may be, provided that allows the event planner to see where the proposed event may fit on the invitee's calendar. In this case, a candidate time 475 that visually identifies a possible time span of the event to be scheduled may be overlaid on the interface 400, for example, when a mouse cursor is over the calendar grid 410. As can be seen in FIG. 4, the event to be scheduled is 90 minutes in duration and the candidate time occupies a relative amount of temporal space on the grid 410.

The start time of this candidate time (the top of the block 475) follows the vertical position of the mouse cursor. The end time (the bottom of block 475) may similarly adjust so that the height of the block may remain constant. The event planner may therefore move, for example, a mouse cursor over the calendar to visually see where a proposed event may fit in the invitee's schedule. This candidate time may not be shown when the mouse cursor is not over the calendar grid.

By correlating the length of the event with the temporal size of the calendar, the event planner is more easily able to identify available times for the scheduling of the meeting. Further, by clicking, for example, a mouse while the candidate time is displayed, the organizer may cause a scheduled time template 430 to automatically be completed so that the date, start time, and duration correspond to the current location of the candidate time. A "send" button 440 may be 'pressed' to send a notification to the invitee of the proposed event time as discussed in the context of the method of FIG. 3.

The information actually displayed to the event planner through interface 400 may vary depending upon particular security settings. For example, an event planner may only be provided with generic blocks of availability and unavailability. The event planner may also be provided with certain information such as the name or type of the event that is causing the invitee to be unavailable (e.g., dentist appointment, dinner with friends, etc.). Additional information may be provided with regard to the location of these events or other participants in the events (e.g., other meeting participants).

Various security settings may be configured by the invitee for the event planner on a per event basis or globally for all events.

Additional customized features may also be implemented in the present scheduling application including indications of, for example, the availability of conference rooms or conference tools (e.g., a projector) to avoid the scheduling of a meeting only to discover a meeting facility is unavailable or a particular piece of equipment needed in the meeting is presently being used by another party or in another meeting. Additionally, certain invitees may be given event priority such that if there are no acceptable times that work out for all invitees, the priority and importance of particular invitees is determined and analyzed with regard to finding an agreeable/available meeting time amongst those invitees who are essential to the meeting. For example, the organizer may elect to turn off the busy time for some invitees or to show the busy time for high priority invitees as darker (having less transparency).

In further embodiments of the present invention, the interface 400 may display additional day and time data. For example, the interface 400 of FIG. 4 displays a single day and a single range of times within that day. In further embodiments, date and time information may also be displayed for other time zones by using additional time-of-day columns. This functionality may be particularly useful and of interest when an event planner and the various invitees are in a different time zone. The display of multiple time zones may be dynamic with respect to an event planner clicking on or highlighting a particular data set of availability as it pertains to a particular invitee in a particular time zone.

Graphical illustrations of time of day (e.g., shading gradients behind time of day columns with respect to sunrise and sunset) with respect to particular invitees or the event planner may also be illustrated in the interface 400 of FIG. 4. This information may be particularly useful and of interest to the planning of events that depend on the presence or absence of natural daylight (e.g., a picnic versus a fireworks display). This information, too, may be displayed with respect to particular invitees or the event planner.

In some embodiments of the present invention, the calendar information displayed in the interface 400 of FIG. 4 is updated in real-time. Therefore; if an event planner is presently viewing certain calendar information and the calendar owner adds another appointment or removes an appointment, that change in calendar data will be updated in real-time (or substantially in real-time). That is, the user is not required to affirmatively deliver the changed calendar data to an event planner through a 'send' selection although some embodiments of the present invention may allowed for delayed updates that are subject to manual interaction by the user.

Various real-time update mechanisms may be utilized. For example, upon identification of a calendar data disparity, a push or pull operation may be initiated wherein the calendar data is synchronized between devices and subsequently displayed to the event planner. The disparity may be the result of a user having just entered new information in their calendar at their desktop or through the synchronization of the user's calendar application with, for example, a mobile device with an associated calendar application. In some embodiments of the present invention, a combination of update methodologies may be utilized. Various other methodologies for providing substantially real-time updates of calendar data may be implemented within the scope of the present invention and are known to one of ordinary skill in the art such as fetching the relevant calendar data each time the organizer accesses a URL for an event.

A computer readable storage medium comprising instructions executable by a processor may perform a method for granting access to calendar data.

While the present invention has been described in connection with a series of preferred embodiment, these descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art.

What is claimed is:

1. A method for granting access to invitee calendar data stored in memory, the method, comprising:
   receiving an identification of a closed time interval that identifies a possible range of times in which an event may be scheduled, the closed time interval including:
      an ending date,
      at least one day of the week within the closed time interval, and
      a time of day interval; and
   executing instructions stored in memory, wherein execution of the instructions by a processor grants computing device access to at least a portion of the invitee calendar data within the closed time interval the need for concurrent invitee confirmation, wherein calendar data not within the closed time interval is not accessible by the computing device, and wherein the grant of access is in response to a request for an event to be scheduled.

2. The method of claim 1, further comprising sending a calendar access message to the computing device of the party submitting the request for an event to be scheduled, the calendar access message associated with the grant of access to the calendar data.

3. The method of claim 2, wherein the calendar access message includes a keyed uniform resource locator associated with a secure user interface for accessing the calendar data.

4. The method of claim 1, further comprising receiving a proposed event time from the computing device, the proposed event time falling within the time intervals for the at least one day of the week within the closed time interval.

5. The method of claim 4, further comprising adding an event corresponding to the proposed event time to the calendar data.

6. The method of claim 5, further comprising sending a confirmation to the computing device proposing the event corresponding to proposed event time.

7. The method of claim 1, wherein the closed time interval also includes a start date, and the calendar data prior to the start date is not accessible by the computing device.

8. The method of claim 1, further comprising denying access to calendar data associated with events scheduled in the past.

9. The method of claim 1, wherein the at least one day of the week is all days of the week.

10. The method of claim 1, wherein the time of day interval is all day.

11. The method of claim 1, wherein the identification of the closed time interval is generated by a calendaring application that is different from a calendaring application at the computing device, each calendar application compatible with the calendar data.

12. The method of claim 1, wherein the identification of the closed time interval is generated through a calendar application.

13. The method of claim 1, further comprising acquiring calendar data from a computing device communicatively coupled to a calendaring server through execution of an acquisition module stored in memory at the calendaring server, the acquired calendar data then stored for hosting by the calendaring server for access by an organizer computing device.

14. The method of claim 1, wherein the portion of the invitee calendar data within the closed time interval does not include certain events as a part of the grant to the computing device.

15. The method of claim 14, wherein the certain events are selected from the group consisting of personal information on a business calendar, business information on a personal calendar, and information off limits to all persons but the owner of the calendar data.

16. The method of claim 1, wherein the grant to the at least a portion of the invitee calendar data occurs automatically and without the need to approve access to the at least a portion of the invitee calendar data.

17. The method of claim 1, wherein the grant to the at least a portion of the invitee calendar data requires prior approval by the invitee.

18. The method of claim 1, wherein the identification of the closed time interval corresponds to a predetermined layout.

19. The method of claim 1, wherein the identification of the closed time interval occurs in response to parsing of a request for access to calendaring data.

20. The method of claim 19, wherein the parsing of the request occurs at a calendaring server.

21. The method of claim 19, wherein the parsing of the request occurs at the computing device.

22. The method of claim 1, wherein the grant of access to the at least a portion of the invitee calendar data is accompanied by a personalized message.

23. The method of claim 1, wherein the grant of access to the at least a portion of the invitee calendar data is accompanied by an advertisement.

24. The method of claim 1, wherein the at least a portion of the invitee calendar data granted reflects unavailability of the invitee due to travel time associated with a selected event.

25. The method of claim 24, wherein the travel time is computed based on travel time to or from pre-existing invitee events and the selected event.

26. The method of claim 1, wherein the at least a portion of the invitee calendar data granted is presented concurrently with information reflecting the availability of equipment or a facility needed for an event being scheduled.

27. The method of claim 1, wherein the at least a portion of the invitee calendar data granted is presented concurrently with information reflecting the availability of other invitees to an event being scheduled.

28. The method of claim 27, wherein the information reflecting the availability of other invitees to the meeting is presented based on the importance of attendance of each invitee to the event.

29. The method of claim 27, wherein the availability of the other invitees is presented using shading on a calendar grid.

30. The method of claim 29, wherein the intensity of the shading takes into account the number of invitees not available at the corresponding time.

31. The method of claim 29, wherein the intensity of shading takes into account the importance of each invitee with respect to their attendance at the event.

32. The method of claim 1, wherein the at least a portion of the invitee calendar data granted reflects real-time updates to the calendar data made by the invitee.

33. The method of claim 1, wherein the at least a portion of the invitee calendar data granted reflects updates to the calendar data on demand.

34. The method of claim 1, wherein the identification of the closed time interval is generated by the computing device.

35. The method of claim 1, wherein the identification of the closed time interval is generated by a computing device associated with the invitee.

36. A non-transitory computer-readable storage medium having embodied thereon a program, the program being executable by a processor to perform a method for granting access to invitee calendar data, the method comprising:
   receiving an identification of a closed time interval that identifies a possible range of times in which an event may be scheduled, the closed time interval including:
      an ending date,
      at least one day of the week within the closed time interval, and
      a time of day interval; and
   granting a computing device access to at least a portion of the invitee calendar data within the closed time interval without the need for concurrent invitee confirmation, wherein calendar data not within the closed time interval is not accessible by the computing device, and wherein the grant of access is in response to a request for an event to be scheduled.

37. The non-transitory computer-readable storage medium of claim 36, the method further comprising sending a calendar access message to the computing device of the party submitting the request for an event to be scheduled, the calendar access message associated with the grant of access to the calendar data.

38. The non-transitory computer-readable storage medium of claim 37, wherein the calendar access message includes a keyed uniform resource locator associated with a secure user interface for accessing the calendar data.

39. The non-transitory computer-readable storage medium of claim 37, the method further comprising adding an event corresponding to the proposed event time to the calendar data.

40. The non-transitory computer-readable storage medium of claim 39, the method further comprising sending a confirmation to the computing device proposing the event corresponding to proposed event time.

41. The non-transitory computer-readable storage medium of claim 36, the method further comprising receiving a proposed event time from the computing device, the proposed event time falling within the time intervals for the at least one day of the week within the closed time interval.

42. The non-transitory computer-readable storage medium of claim 36, wherein the closed time interval also includes a start date, and the calendar data prior to the start date is not accessible by the computing device.

43. The non-transitory computer-readable storage medium of claim 36, further comprising denying access to the calendar data to calendar data associated with events scheduled in the past.

44. The non-transitory computer-readable storage medium of claim 36, wherein the at least one day of the week is all days of the week.

45. The non-transitory computer-readable storage medium of claim 36, wherein the time of day interval is all day.

* * * * *

UNITED STATES PATENT AND TRADEMARK OFFICE
CERTIFICATE OF CORRECTION

PATENT NO. : 8,630,885 B2
APPLICATION NO. : 11/501637
DATED : January 14, 2014
INVENTOR(S) : Daniel Klausmeier It is certified that error appears in the above-identified patent and that said Letters Patent is hereby corrected as shown below:

In the Claims
Column 20, lines 13-30, Claim 1 should read
-- 1. A method for granting access to invitee calendar data stored in memory, the method comprising:
    receiving an identification of a closed time interval that identifies a possible range of times in which an event may be scheduled, the closed time interval including:
        an ending date,
        at least one day of the week within the closed time interval, and
        a time of day interval; and
    executing instructions stored in memory, wherein execution of the instructions by a processor grants a computing device access to at least a portion of the invitee calendar data within the closed time interval without the need for concurrent invitee confirmation, wherein calendar data not within the closed time interval is not accessible by the computing device, and wherein the grant of access is in response to a request for an event to be scheduled. --

Signed and Sealed this
Twenty-fifth Day of March, 2014

Michelle K. Lee
*Deputy Director of the United States Patent and Trademark Office*